May 14, 1957 M. C. BECKER 2,792,532
METHODS AND APPARATUS FOR MAGNETIZING PERMANENTLY
MAGNETIZABLE MATERIAL
Filed Dec. 12, 1952 2 Sheets-Sheet 1
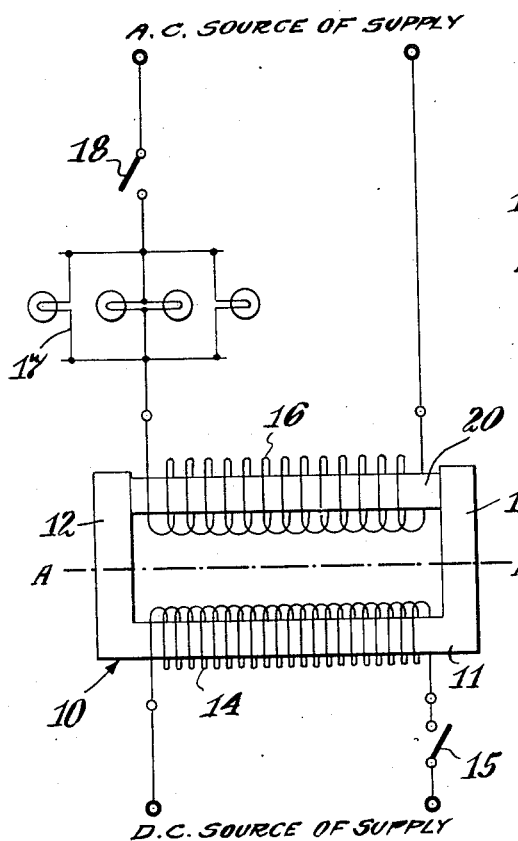
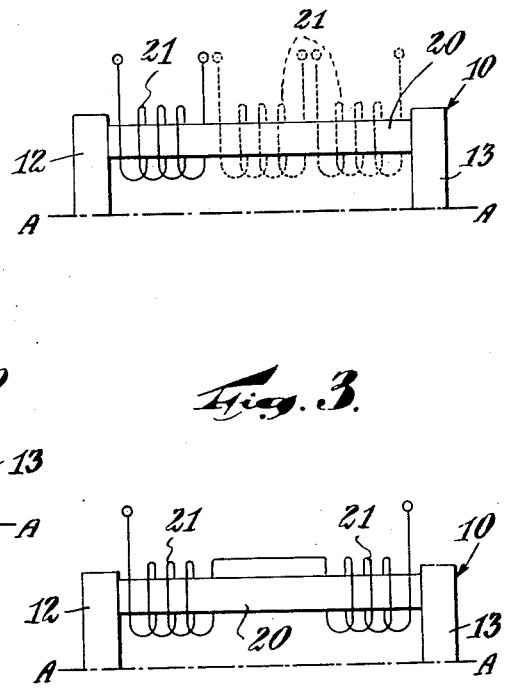
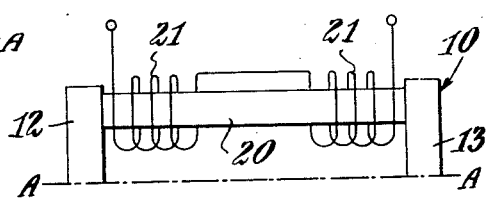
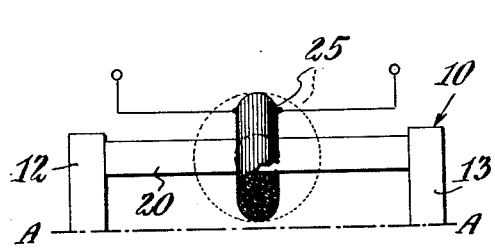
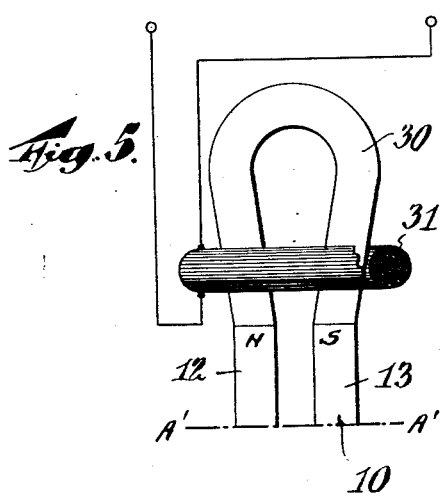
INVENTOR
MAXIMILIAN C. BECKER.
BY
Angelo M. Pisarra
ATTORNEY INVENTOR
MAXIMILIAN C. BECKER
BY
Angelo M. Pisarra
ATTORNEY

United States Patent Office 2,792,532
Patented May 14, 1957

2,792,532

METHODS AND APPARATUS FOR MAGNETIZING PERMANENTLY MAGNETIZABLE MATERIAL

Maximilian C. Becker, East Orange, N. J.

Application December 12, 1952, Serial No. 325,636

7 Claims. (Cl. 317—123)

This invention relates to novel apparatus and to novel methods for treating certain materials. In one of its specific aspects the invention is directed to novel apparatus and to novel methods for magnetizing material capable of being permanently magnetized.

Prior to this invention, materials capable of being permanently magnetized were generally permanently magnetized by placing the ends of the material across two poles of an electromagnet. Then through the coils of the electromagnet was sent uni-directional current of high amperage value to create a very large uni-directional polarizing flux between the pole pieces. The uni-directional polarizing flux required was necessarily large in order to overcome the great coercive force of the material so as to render it permanently magnetized. In normal commercial practice, and for most purposes, particularly when it was necessary to permanently magnetize a unit of such material of appreciable size and being characterized by having a high coercive force, it was necessary to pass through the coils of the electromagnet uni-directional current of very large amperage value. Because of this, very large coils for the electromagnet were required and in addition electrical apparatus which of itself is expensive and requires expensive maintenance were necessary for conversion of the generally available alternating current to uni-directional current as the source of supply for the coils. In factory practice sometimes this apparatus was quite large and cumbersome and cost thousands of dollars in its original installation. Because of the large amount of iron in the pole pieces and yoke of the electromagnet and because of the large amount of copper in its coils, the electromagnet had considerable inductance and consequently it would take the uni-directional flux from 3 to 5 seconds to build up to its peak value to provide the necessarily great magnetomotive force to overcome the coercive force inherent in the metal capable of being permanently magnetized to convert it into a permanent magnet. Because of the weight of such apparatus together with its associated parts, and this weight sometimes may be as high as a ton in certain factories, it is not portable equipment. Consequently, in using such apparatus it has been necessary to take the work to the apparatus because it obviously was impossible to move the entire apparatus from bench to bench.

Notwithstanding the foregoing specific shortcomings as well as other disadvantages inherent in such apparatus and method for treating a material capable of being permanently magnetized to convert it into a permanent magnet, the foregoing apparatus and method have been substantially universally employed for the aforesaid purpose for many, many years and are still being employed for that purpose.

After the permanently magnetizable materials were completely saturated by employing the aforesaid method and apparatus, usually it was necessary in certain industries, as for example the instrument industry, to partially demagnetize such permanent magnets for the purpose of calibration and stability in service. This has been accomplished by subjecting the material, which has been hitherto permanently magnetized to complete saturation, to a flux field of alternating and decaying characteristics.

Contrary to the prior art, I have made a startling discovery which is embodied in the present invention. By employing my invention it is now for the first time possible to provide apparatus for permanently magnetizing material capable of being permanently magnetized with apparatus which is relatively inexpensive, very cheap to maintain, of light weight and therefore portable, and which is versatile and fast. In addition to the foregoing advantages, apparatus embodying my invention have the additional significant features and advantages in that all that is required for its operation is the normal A. C. current obtainable from the contacts of the female outlet of an ordinary household circuit making it a portable and readily useful device. Still another significant advantage of my invention is that the device may be made completely independent of any outside source of electrical supply by employing ordinary and commercially available batteries and condensers as components thereof. Instead of employing the batteries as the source of supply, it is also practicable and feasible to charge the condensers, when they are used, from magnetos and similar electrical generator devices found in airplanes, trucks, etc.

In contrast to the methods of the prior art which requires all of the energy to be applied as a heavy uni-directional polarizing flux to the material capable of being permanently magnetized to permanently magnetize it, this invention is predicated upon an altogether different and startling procedure. According to this invention, permanently magnetizable materials are permanently magnetized by utilizing input energy consisting of a relatively small uni-directional polarizing flux together with a greater flux field of increasing and decreasing amplitude applied directly to the material to be permanently magnetized. A specific manner of accomplishing that purpose is to subject such a material to a uni-directional polarizing flux of a low intensity and which is of a value greatly less than, and for most purposes may be only approximately 10–20% of, that normally required, and by "normally required" I mean if used alone would be required, to substantially completely saturate said material. While said small uni-directional polarizing flux is impressed on said material, the material is subjected to a flux field of reversing polarity and increasing and decreasing intensity or amplitude of a value normally sufficient, and by "normally sufficient" I mean if used alone would be sufficient, to at least partially demagnetize said material if it had been permanently magnetized. For most purposes, the value of said flux field of increasing and decreasing amplitude is at least 50% and where it is desired to assure substantially complete saturation it is 100% of or more than that required to substantially completely demagnetize said material if it had been substantially completely saturated. Then while said uni-directional polarizing flux is still impressed on said material, the value of the flux field of increasing and decreasing intensity is decreased for all practical purposes to zero, but in any event to a value less than that required to demagnetize said material coupled with said uni-directional polarizing flux. Then the material which is now a permanent magnet is removed from said polarizing flux.

My theory of what takes place in the practice of my novel invention is that when, as in the prior art, only a uni-directional polarizing flux is employed to substantially completely saturate a permanently magnetizable material, such polarizing flux impressed on that material must be very great due to the energy required to overcome the prevailing status and condition of the domains of the material and to orient them in the required position and condition; but in the practice of my invention, impressing a relatively high flux field of increasing and decreasing intensity on such material while under the influence of a relatively small polarizing flux, modifies the status and condition of the domains and "loosens," "shakes" or "unlocks" them, so to speak, whereby even such small polarizing flux is sufficient to orient them in the required position and condition.

Various devices such as permanent magnets as well as electromagnets, for example, may be employed for providing the weak uni-directional polarizing flux; and alternating current or oscillating current flowing through a coil for example may be employed for providing flux fields of increasing and decreasing value or amplitudes. Such flux fields obtained by the use of alternating or oscillating current have alternating characteristics. The alternating current supply, for providing flux fields of increasing and decreasing intensities or amplitudes which in such cases would be an alternating flux field, would be that from the contacts of the ordinary household or factory outlet capable of supplying standard 60 cycle current. The oscillating flux fields may be obtained by charging a condenser from a suitable source of direct current, such as dry "B" batteries, and discharging the condensers; and this system and method is especially useful in those places where the source of supply, other than batteries, magnetos, etc. is not available.

The invention accordingly comprises the several steps and the relation of one or more of such steps with respect to each of the others, and the apparatus embodying features, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which Fig. 1 is a diagrammatic view of novel apparatus of this invention and shows the position of the element to be permanently magnetized in relation to the other parts of the apparatus.

Fig. 2 is a diagrammatic view illustrating a smaller size coil surrounding the element to be permanently magnetized, said coil to be substituted for the element-surrounding-coil in the apparatus shown in Fig. 1.

Fig. 3 is a diagrammatic view illustrating a pair of electrically connected coils surrounding the element to be permanently magnetized, said coils to be substituted for the element-surrounding-coil in the apparatus shown in Fig. 1.

Fig. 4 is a diagrammatic view illustrating a toroidal shape coil surrounding the element to be permanently magnetized, said coil to be substituted for the element-surrounding-coil in the apparatus shown in Fig. 1.

Fig. 5 is a diagrammatic view of a generally toroidal shape coil surrounding a "C" or horseshoe element to be permanently magnetized, said coil to be substituted for the element-surrounding-coil in the apparatus shown in Fig. 1 whose electromagnet is modified to dispose its pole pieces close to each other to accommodate the ends of the element to be permanently magnetized.

Figure 6:
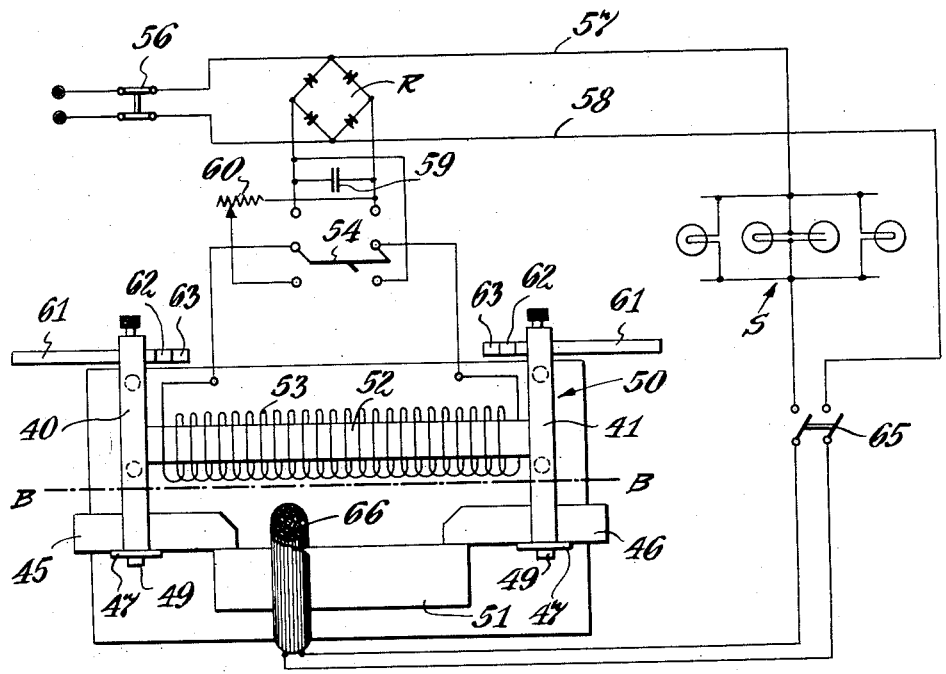
Figure 7:
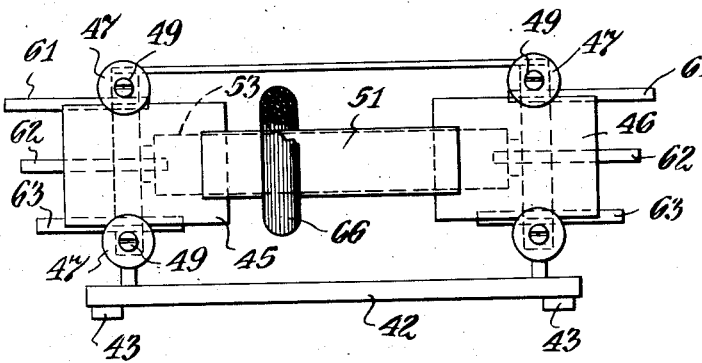
Figure 8:
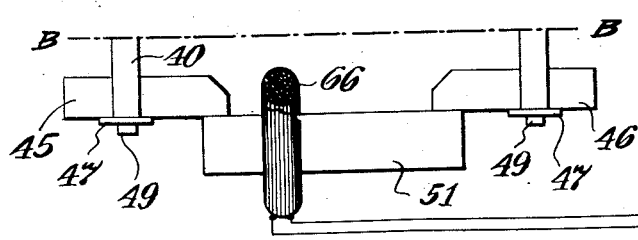

Fig. 6 is a diagrammatic view of another modification of the invention. Fig. 7 is a top plan view of part of the apparatus shown in Fig. 6. Fig. 8 is a diagrammatic view of still another modification of the invention.

The apparatus diagrammatically shown in Fig. 1 is a novel, simple, inexpensive apparatus for practicing a novel method of this invention for permanently magnetizing a material capable of being permanently magnetized. As shown in Fig. 1, the apparatus comprises means 10 for providing uni-directional flux. The means 10 may be an electromagnet consisting of a yoke 11 having a pair of oppositely disposed pole pieces 12 and 13 and a coil 14 surrounding yoke 11 and connected to a direct current source of supply through a switch 15. The direct current source of supply may of course be derived from an original alternating current supply which may be converted to direct current in any suitable manner. The apparatus also includes another coil 16 connected to an alternating current source of supply in series with a bank of tungsten incandescent lamps 17 arranged in parallel and switch 18. The coil 14 is so designed as to provide sufficient ampere turns so that the uni-directional flux between the pole pieces upon energization of coil 14 by closing of the switch 15 will be greatly less than that alone required to substantially completely saturate a given piece of permanently magnetizable material if disposed between pole pieces 12 and 13. The coil 16 is so designed as to provide the flux field of increasing and decreasing amplitude or intensity of a value sufficient to demagnetize said given piece of material if it had already been magnetized.

In the practice of a novel method of this invention, a bar 20 for example, of material capable of being permanently magnetized is inserted through the central opening of coil 16 and its ends are disposed contiguous with the pole pieces 12 and 13 at their ends. The switch 18 is allowed to remain in open position and switch 15 is closed whereupon direct current flows through the coil 14 to cause the establishment of a polarizing flux between the ends of the poles 12 and 13 equal to approximately 10–20% of that required when used alone to substantially completely saturate bar 20. While said polarizing flux is still maintained between the ends of the pole pieces 12 and 13 and acting upon bar 20, the switch 18 is closed. Upon closing of the switch 18 alternating current flows through the circuit comprising the bank of incandescent lamps 17 in series with the coil 16; and when this circuit is initially made upon closing of switch 18 there is produced a high amperage surge through the coil 16 for only a very short period of time to establish for such very short period of time a relatively high alternating flux field impressed directly upon the bar 20 having said polarizing flux impressed thereon from the electromagnet 10. The high amperage surge through coil 16 is due to the low initial resistance of the bank of lamps when the circuit is first made upon closing of switch 18, because the tungsten filaments of said lamps are initially at about room temperature and therefore have low resistance characteristics. These lamps serve to automatically control the resistance of the circuit and permits in-rush current flow of a magnitude about ten times its normal, because the resistance of the lamp filaments greatly increases after the initial surge of current therethrough which brings them to incandescent operating temperature. Consequently, substantially immediately after the lamp filaments are brought to operating temperature, and this occurs practically instantaneously upon closing of switch 18 due to the heavy in-rush current flow in that circuit, the current in that circuit automatically is reduced to about one-tenth that of the in-rush current. Because the in-rush current builds up so rapidly due to the very low inductance and due to the low resistance of the lamp filaments, the lamp filaments become incandescent practically instantaneously upon making the circuit and practically immediately thereafter the current flow in that circuit is greatly reduced to normal due to the change in resistance of the incandescent filaments. Consequently the heavy in-rush current does not flow through the coil 16 for any appreciable amount of time which would cause overheating and therefore smaller coils 16 may be employed.

The following is a specific example given merely by way of illustration and not to be taken by way of limitation of a specific design of the apparatus shown in Fig. 1 and a specific method for magnetizing a bar 20, which for the purposes of illustration only may be composed of "Alnico V," one of the various materials capable of being permanently magnetized and measuring about 4" x 1" x 1". In this case, the coil 14 has approximately 10,000 turns of insulated copper wire; and the direct current flowing therethrough upon making of its circuit by closing switch 15 is approximately one-half ampere. The coil 16 is approximately four inches long and has approximately 300 turns of insulated copper wire. Four 300 watt 110 volt tungsten filament incandescent lamps are connected in parallel in the lamp bank so that the in-rush current through coil 16 may be approximately 100 amperes.

In operation the bar 20 is slipped through the central opening of the coil 16 and this combination is disposed between the ends of the pole pieces 12 and 13, with the coil 16 extending over substantially the entire length of the bar 20. Switch 15 is closed to make the direct current circuit including coil 14. Then switch 18 is closed and shortly thereafter opened. Then switch 15 is opened and the bar 20 which has become saturated is removed from the pole pieces and out of coil 16 and is a permanent magnet characterized by having a saturation value greater than 90% and close to 98% to 100% of complete saturation.

Instead of employing a coil 16 which extends substantially the full length of the bar 20, I may employ a shorter coil 21, such as that shown in Fig. 2. In this particular illustrative example, the coil 21 has a length which is but a fraction of the length of coil 16 and as shown is approximately one-third the length of bar 20. In this instance, the coil 21 measures about one and one-half inches in length and has approximately 100 turns of insulated copper wire. By employing the same elements as those of Fig. 1 except that coil 21 is substituted for coil 16 as shown in Fig. 2, coil 21 may first be located at the left end of the bar 20 and the switches 15 and 18 are closed and opened in the sequence heretofore described. After the switch 18 is opened, the left end only of the bar 20 will be found to have been permanently magnetized. The coil 21 may be moved over to surround the next third length of bar 20 and again the switches 15 and 18 are actuated in the same sequence as before. The bar 20 then will be found to have been permanently magnetized over that two-thirds of its length. To permanently magnetize the bar 20 over its entire length, the coil 21 is moved to the last third of the length thereof and for the third time the switches 15 and 18 are actuated in the same sequence as before. By employing this particular embodiment of the invention any predetermined portion or portions or the entire length of bar 20 may be permanently magnetized.

When it is desired to permanently magnetize only the ends of the bar 20 or the length thereof still another method may be used. Two separate coils 21 may be simultaneously employed as shown in Fig. 3 and these coils 21 may be connected to each other in non-inductive relationship as shown. The coils 21 may be of any desired length depending upon the length of the ends of bar 20 which it is desired to magnetize, it being understood that magnetization of the entire length of bar 20 is feasible by employing coils 21 in such relationship and of such length that together they extend the full length of bar 20.

In the embodiments shown in Figs. 1–3, the bar 20 is located in the central opening through the coils 16 or 21 and therefore is closely coupled with the flux field thereof upon energization of the coil. While it is preferable to have such relationship of parts for the magnetization of a material capable of being permanently magnetized, such disposition of said elements is not always feasible or practical because of the shape of the material to be permanently magnetized or for some other reason. At a sacrifice of efficiency, the bar 20 may be magnetized by disposing bar 20 outside of the central opening through the coil 16 and locating the bar 20 adjacent the outside of the coil. Instead of having the coil 16 an elongated element as shown in Fig. 1, it may be of toroidal shape as shown in Fig. 4 at 25, and may be disposed in the position shown in full lines with bar 20 therethrough or in the position shown in dotted lines with the bar 20 outside of the coil 25, and in either position serves the same purpose as coil 16 and may be substituted therefor. However, for most efficient operation and where practical, I prefer to employ the coil 16 as shown in Fig. 1 or the toroidal coil 25 in its position as shown in full lines of Fig. 4.

Permanently magnetizable material of C or horseshoe shapes have heretofore required special apparatus for their magnetization due to the small gap between their ends. As shown in Fig. 5 such shaped elements of permanently magnetizable material may also readily and easily be permanently magnetized by employing this invention. The electromagnet 10 is so designed that its pole pieces 11 and 12 are close to each other so that the ends of shaped C or horseshoe element 30 may be disposed contiguously therewith as shown in Fig. 5. The element 30 is encircled by a toroidal shape coil 31 and in this embodiment serves the same purpose as does the coil 16 in the diagram shown in Fig. 1.

All of the various apparatus heretofore described may be employed to practice this invention by employing either alternating current or oscillating current as the source of electric supply for the circuit including the lamp bank and either the coils 16, 21 or 31 and in the course of permanently magnetizing a 4" x 1" x 1" element of Alnico V, for example, by employing the method as aforedescribed, using about 5,000 ampere turns of uni-directional polarizing flux at said coil 14 to assure substantially complete magnetization.

Still another embodiment of this invention is shown in Figs. 6 and 7 and comprises a pair of laterally spaced members 40 and 41 capable of carrying a magnetic flux and therefore being composed of iron or soft steel. The members 40 and 41 may be mounted on a supporting plate 42 composed of wood, resinous or other non-magnetic material and having a rubber cushion 43 at each of its four corners for supporting the assembly on a table. At the ends of members 40 and 41 there are supported pole shoes 45 and 46, with each of them being held in the same direction by washers 47 and screws 49. As shown in Fig. 7, the washers 47 are of such diameter as to overlap the edges of the pole shoes 45 and 46. With this arrangement the pole pieces 45 and 46 may be adjusted to accommodate any length of permanently magnetizable material 51 which is to be permanently magnetized. To the rear of the pole pieces 45 and 46 or adjacent thereto is a core member 52 of an electromagnet 50 having a coil or winding 53 thereon consisting of a number of turns of insulated copper wire. The winding or coil 53 is connected to the central point of a switch 54 that has contacts connected to a rectifier R that in turn is connected to a main line switch 56 controlling the flow of alternating current from a source of supply to the conductors 57 and 58. A condenser 59 may be utilized with the rectifier R and a variable or adjustable resistance 60 may be associated with switch 54, the latter of which acts as a reversing switch to reverse the current through the coil 53 for the purpose to be described later. Connected to the rear ends of each of the members 40 and 41 are a plurality of flux shunt devices 61, 62 and 63 which are preferably in the form of iron or steel rods that are adjustable independently of each other for regulating the amount of flux that passes through the pole pieces 45 and 46. While I have shown three sets of these flux controlling members, it may be necessary in some cases to use one or more pairs or none at all, depending on the conditions. Connected to one of the line wires, such as 57, is one or more key sockets S adapted to accommodate commercially available lamps of various wattage. The lamps employed are tungsten filament incandescent lamps. The bank of key sockets S and the lamps contained therein are in series with a source of alternating current supply through the wires 57 and 58 and in series with a switch 65 one side of which is connected to an energizing coil 66 which is adapted to be placed around the material 51 to be magnetized or a coil producing the external field having one or more turns could be wound directly on the material to be magnetized and energized from a transformer or it could be entirely outside of that material and two or more coils could be used externally.

The magnetizing structure, the main part of which is made up of the electromagnet 50 and coil 53 together with the other associated parts measured approximately 1 ft. by 6 inches and has a total weight of approximately 15 lbs.

In operation of the device shown in Fig. 1, four 300 watt 110 volt tungsten filament incandescent lamps are placed in the key sockets S. The main line switch 56 is closed to provide 60 cycle alternating current in the lines 57 and 58. Switch 54 is closed so that uni-directional current of relatively low amperage value flows through the coil 53 whereupon there is created a uni-directional polarizing flux, which passes from the pole piece 45 through the material 51 to be magnetized to the pole piece 46, of a very low value and not much more than enough to hold the material 51 in position. While the aforesaid condition is maintained, the switch 65 is closed for a short period of time and then opened. Upon closing of switch 65 in-rush current of high amperage value flows through the coil 66 for only a very short period of time due to the presence of the four 300 watt lamps arranged in parallel as shown to provide a lamp bank in series with coil 66. Upon the lamps becoming incandescent, which is practically instantaneous upon closing of switch 65, the current through coil 66 is immediately thereafter reduced to normal, that is a value greatly less than the in-rush current value. This high impulse of alternating current through the coil 66 sets up a disturbance in the material 51 creating what I believe to be an instability or loosening in the atoms or domains of material 51 so that the weak uni-direction flux from pole 45 to pole 46 arranges the moving or loosened domains or atoms in the material 51 so that the north poles of practically all of them will be in the same direction resulting in substantially complete magnetization of the permanently magnetizable material 51, and from the tests that I have made this small structure will magnetize a piece of permanently magnetizable material as efficiently as an electromagnet heretofore used that weighs much over a thousand pounds.

In Fig. 7 in place of the electromagnet 50 in one of the other embodiments of the invention, I used a permanent magnet P that is preferably shielded with copper, aluminum, etc. The battery B and a bank of condensers C when charged and discharged by operation of switch 67 take the place of the alternating current supplied by the switch 65 of Fig. 6. With this arrangement the coil 66 is energized by an oscillating current having the alternating characteristics of alternating current as first described in connection with Fig. 5. In this embodiment of the invention ordinary and well known, commerically available dry "B" batteries may be employed.

From what has been said it will be seen that I have devised a small apparatus that will do the work of the large, heavy and expensive prior art structures. Besides reducing the cost and lessening the weight of the whole structure it eliminates entirely the accessory equipment usually needed to produce the large amount of direct current heretofore required.

My new apparatus can be carried in a brief case and taken out onto a job if necessary and put into operation by merely plugging it into an ordinary A. C. wall outlet. The device as shown in Fig. 7 is especially adapted for use where there is no source of alternating current, by using a magnet P and a small light weight "B" battery B and condenser C. Either type of apparatus is especially useful in many fields such as in the armed forces, for the repairs of instruments, radios, telephones and the like. A further advantage is that it will save considerable dismantling and assembly time since the magnet on the equipment to be remagnetized can simply be pushed against the pole pieces 45 and 46 and the coil to supply the alternating or oscillating flux field may extend around the device. In this manner the magnet may be reconditioned to the required strength in a simple and easy fashion.

I have found that the structures are particularly useful in magnetizing long lengths of material capable of being permanently magnetized and in doing this the coil 66 will magnetize a certain length on the long piece 51 and then the coil may be slid along in steps defined by the width of the coil and energized at each step. I have further found that in some cases with certain types of magnets it is advisable after the material 51 has been magnetized to approximately its maximum to reduce this somewhat. This may be accomplished by employing still another embodiment of this invention. According to this invention a weak uni-directional polarizing flux may be applied to the element which has been previously saturated and this flux may be of a value approximately that or materially less than that originally impressed on the permanently magnetizable material heretofore described. With the device illustrated in Fig. 6 this may be accomplished by adjusting the resistance 60 and/or use of the shunts 61, 62 or 63. In addition for this purpose, the direction of the uni-directional flux field is reversed either by reversal of the element to be treated or as shown in Fig. 6 by actuation of the reversing switch 54 whereupon the direction of the uni-directional polarizing flux impressed on the permanently magnetized element is opposite to that of the flux of said element. Then the element under such condition is subjected to a flux field of alternating characteristics which is of a value which is high compared with that of the uni-directional flux field but is greatly lower than that originally employed in the course of saturating said element. This is accomplished by merely actuating the keys of the sockets S to cut out of the circuit three of the four lamps in the bank for example. Then the switch 65 is closed whereupon alternating current of greater value than normal flows through coil 66 to impress an intense alternating flux field on the element 51 for a very short period of time to reduce the degree of magnetization of the element 51 which had previously been substantially completely saturated. Then switch 65 is opened after which switch 54 is opened.

The same procedure as before may be followed with the apparatus shown in Fig. 7. In this instance, the position of the permanently magnetized element is reversed and three of the four condensers C are cut out of the circuit for this purpose.

From the tests that I have made, it is my belief that with at least certain types of material that this slight reversal of flux will produce far more stable magnets when demagnetized to a given strength.

While I have mentioned certain advantages of my method of energizing permanently magnetizable material, this method will be valuable in the production of such materials with anisotropic properties such an Alnico V which are present limited in size by the uni-directional field that can be maintained through them during the cooling cycle, etc. In the course of making said material and in the cooling stage, etc., I propose to encircle it with a coil or coils made of heat resistant wire such as Nichrome and periodically send high pulses of an alternating current through it and a much weaker uni-directional field could be used or much longer magnets treated with a given uni-directional field.

While I have shown structures from which I have obtained excellent results and proven my theory, it will be obvious that certain of the mechanical and electrical details may be varied without departing from the spirit of the invention and scope of the appended claims.

Since certain changes in carrying out the aforesaid methods and in the apparatus set forth which embody the invention may be made without departing from its scope, it is intended that all of the matter contained in the aforesaid description or shown in the accompanying drawings shall be interpreted as illustrative and not in a limiting sense.

It is also to be understood that the following claims are intended to cover all the generic and specific features of the invention herein described, and all statements of the scope of the invention, which as a matter of language might be said to fall therebetween.

This application is a continuation-in-part of my co-pending application Serial No. 140,744, filed January 26, 1950.

I claim:

1. Apparatus comprising a permanent magnet, a coil, battery source of electric supply, condenser and means for connecting said electric source to said condenser for charging said condenser therefrom and means for connecting said coil to said condenser for discharging said condenser through said coil to provide oscillating current therethrough to provide flux of varying and decaying intensity on a permanently magnetizable element while said element is subjected to uni-directional flux from said permanent magnet to permanently magnetize said element.

2. Apparatus for permanently magnetizing a permanently magnetizable element comprising means for applying a uni-directional flux to said element of value materially less than that normally required to substantially completely saturate said element, a coil having a central opening, said element disposed in the central opening of said coil, resistance in series with said coil, said resistance being filamentary and characterized by a resistivity at incandescence temperature many times its resistivity at normal temperature, a switch in series with said resistance and said coil and connectable to an alternating current source of supply, and operable, while said element is subjected to said unidirectional flux, to make a circuit comprising said coil, resistance, switch and alternating current supply whereupon in-rush current flows through said coil and said resistance to raise the temperature of said resistance to incandescence practically instantaneously and practically instantaneously thereafter the current in said circuit becomes automatically reduced to a lower amperage value, said in-rush current passing through said coil being such as to provide a flux field of alternating characteristics and of value sufficient to at least partially demagnetize said element if it had been completely saturated and was not under the influence of said first mentioned means.

3. Apparatus for permanently magnetizing a permanently magnetizable element comprising means for applying a unidirectional flux to said element of a value materially less than that normally required to substantially completely saturate said element, said means comprising an electromagnet including a pair of pole pieces, a coil having a central opening and disposed between said pole pieces, said element disposed in the central opening of said coil, resistance in series with said coil, said resistance being filamentary and characterized by a resistivity at temperature of incandescence many times its resistivity at normal temperature, a switch in series with said resistance and said coil and connectable to an alternating current source of supply, and operable, while said element is subjected to said unidirectional flux, to make a circuit comprising said coil, resistance, switch and alternating current supply whereupon in-rush current flows through said coil and said resistance to raise the temperature of said resistance to incandescence practically instantaneously and practically instantaneously thereafter the current in said circuit becomes automatically reduced to a lower amperage value, said in-rush current passing through said coil being such as to provide a flux field of alternating characteristics and of value normally sufficient to at least partially demagnetize said element if it had been completely saturated and not under the influence of said first mentioned means.

4. Apparatus for permanently magnetizing a permanently magnetizable element comprising means for applying a unidirectional flux to said element of a value materially less than that normally required to substantially completely saturate said element, a pair of coils connected to each other in non-inductive relationship and having central openings, said element disposed in the central openings of said coils, resistance in series with said coils said resistance being filamentary and characterized by a resistivity at incandescence temperature many times its resistivity at normal temperature, a switch in series with said resistance and said coils and connectable to an alternating current source of supply, and operable, while said element is subjected to said unidirectional flux, to make a circuit comprising said coils, resistance, switch and alternating current supply whereupon in-rush current flows through said coils and said resistance to raise the temperature of said resistance to incandescence practically instantaneously and practically instantaneously thereafter the current in said circuit becomes automatically reduced to a lower amperage value, said in-rush current passing through said coils being such as to provide flux fields of alternating characteristics and of value normally sufficient to at least partially demagnetize said element if it had been completely saturated and not under the influence of said first mentioned means.

5. The method for permanently magnetizing a permanently magnetizable element comprising while subjecting said element to (A) a unidirectional flux of a value materially less than that required to substantially completely saturate said element, subjecting said element to (B) a flux field, from a coil having an opening therein in which said element is disposed, produced by closing an A. C. circuit including a filamentary resistance in series with said coil, and a source of A. C. supply, said resistance having a resistivity at temperature of incandescence many times that at normal temperature whereupon said making of said A. C. circuit causes in-rush current to flow through said resistance and said coil to practically instantaneously raise the temperature of said resistance to incandescence and practically instantaneously thereafter the current in said circuit becomes automatically reduced to a lower value, and then removing said element in permanently magnetized condition from said uni-directional flux field, said in-rush current passing through coil being such as to provide a flux field of alternating characteristics and of value sufficient to at least partially demagnetize said element if it had been completely saturated and was not subjected to said unidirectional flux.

6. Apparatus defined in claim 2, said resistance comprising a plurality of filaments in electrical parallel relationship with respect to each other.

7. Apparatus defined in claim 3, said resistance comprising a plurality of tungsten filament incandescent lamps in electrical parallel relationship with respect to each other.

References Cited in the file of this patent

UNITED STATES PATENTS

| Number | Name | Date |
| --- | --- | --- |
| 1,301,412 | Elmen | Apr. 22, 1919 |
| 1,398,526 | Luzy | Nov. 29, 1921 |
| 1,408,532 | Price | Mar. 7, 1922 |
| 1,460,759 | Kuhn-Frei | July 3, 1923 |
| 2,075,504 | Chegwidden | Mar. 30, 1937 |
| 2,272,766 | Corson | Feb. 10, 1942 |
| 2,296,764 | Braden | Sept. 22, 1942 |
| 2,532,723 | Knoop | Dec. 5, 1950 |

FOREIGN PATENTS

| Number | Country | Date |
| --- | --- | --- |
| 727,814 | Germany | Nov. 12, 1942 |